United States Patent
Fleury et al.

(10) Patent No.: US 10,091,251 B2
(45) Date of Patent: Oct. 2, 2018

(54) ESTABLISHING COMMUNICATIONS

(71) Applicant: NVIDIA Corporation, Santa Clara, CA (US)

(72) Inventors: Thomas Fleury, Sophia Antipolis (FR); Flavien Delorme, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 240 days.

(21) Appl. No.: 13/856,520

(22) Filed: Apr. 4, 2013

(65) Prior Publication Data
US 2014/0304417 A1 Oct. 9, 2014

(51) Int. Cl.
G06F 15/16 (2006.01)
H04L 29/06 (2006.01)

(52) U.S. Cl.
CPC ...... H04L 65/1069 (2013.01); H04L 65/1016 (2013.01)

(58) Field of Classification Search
CPC .......... H04L 29/06027; H04L 65/4084; H04L 67/02; H04L 67/025; H04L 67/125; H04L 67/14; H04L 25/022; H04L 25/03159; H04L 65/1016; H04L 65/1006
USPC ........ 709/207, 227, 228, 229; 375/222, 219, 375/316, 261, 295, 147, 220, 224, 226, 375/227, 229, 240, 298, 320, 343, 346, 375/350, 371
See application file for complete search history.

(56) References Cited

U.S. PATENT DOCUMENTS

| | | | |
|---|---|---|---|
| 6,055,591 A * | 4/2000 | Nordling | 710/69 |
| 6,910,216 B2 | 6/2005 | Abileah et al. | |
| 6,930,987 B1 * | 8/2005 | Fukuda et al. | 370/328 |
| 7,136,904 B2 | 11/2006 | Bartek et al. | |
| 7,961,756 B1 | 6/2011 | Lambert et al. | |
| 8,429,678 B1 * | 4/2013 | Parthiban et al. | 719/323 |
| 2004/0042450 A1 * | 3/2004 | Monroe et al. | 370/389 |
| 2004/0125774 A1 * | 7/2004 | Hoyt | 370/338 |
| 2005/0213580 A1 * | 9/2005 | Mayer et al. | 370/395.2 |
| 2006/0155814 A1 * | 7/2006 | Bennett et al. | 709/207 |
| 2007/0044002 A1 * | 2/2007 | Johnson et al. | 714/758 |
| 2007/0143489 A1 * | 6/2007 | Pantalone | 709/230 |
| 2008/0028047 A1 * | 1/2008 | Girouard et al. | 709/219 |
| 2008/0117958 A1 * | 5/2008 | Pattenden et al. | 375/222 |

(Continued)

FOREIGN PATENT DOCUMENTS

| | | |
|---|---|---|
| EP | 1881434 A1 | 1/2008 |
| WO | 2009073024 A1 | 6/2009 |

*Primary Examiner* — Hitesh Patel
(74) *Attorney, Agent, or Firm* — Kevin Brown; Parker Justiss, P.C.

(57) ABSTRACT

In one aspect there is provided a host device having: a modem interface arranged to transmit transmission units between the host device and a modem; a communication function configured to generate primitives to establish a communication event between the host device and a remote device; a client agent connected to receive control primitives from the communication function and operable to convert the control primitives to data transmission units; a host routing interface operable to route data transmission units from the client agent according to a predetermined route option which is set based on whether a communication event control function for processing the data transmission units is located on the host device or the modem.

20 Claims, 7 Drawing Sheets

(56) References Cited

U.S. PATENT DOCUMENTS

| | | | |
|---|---|---|---|
| 2009/0006703 A1* | 1/2009 | Fa et al. | 710/305 |
| 2010/0064172 A1* | 3/2010 | George et al. | 714/15 |
| 2010/0110926 A1* | 5/2010 | Pattenden et al. | 370/252 |
| 2010/0134590 A1* | 6/2010 | Lindstrom et al. | 348/14.11 |
| 2010/0197366 A1* | 8/2010 | Pattenden et al. | 455/572 |
| 2010/0220655 A1* | 9/2010 | Helbert et al. | 370/328 |
| 2011/0069635 A1* | 3/2011 | Low | H04W 28/24 370/254 |
| 2011/0275320 A1* | 11/2011 | Pattenden | 455/41.2 |
| 2011/0314145 A1* | 12/2011 | Raleigh | H04L 41/0893 709/224 |
| 2012/0036272 A1* | 2/2012 | El Zur | 709/227 |
| 2012/0317263 A1* | 12/2012 | Zhao | 709/223 |
| 2013/0332503 A1* | 12/2013 | Bae et al. | 709/201 |
| 2013/0332996 A1* | 12/2013 | Fiala et al. | 726/4 |
| 2014/0105260 A1* | 4/2014 | May-Weymann | 375/222 |
| 2014/0233616 A1* | 8/2014 | Belghoul et al. | 375/222 |

\* cited by examiner

ESTABLISHING COMMUNICATIONS

TECHNICAL FIELD

This application relates to establishing and managing communications where a host device uses a modem. In particular the application relates to the handling of data for a communication event established with one or more further terminals.

BACKGROUND

Figure 1:
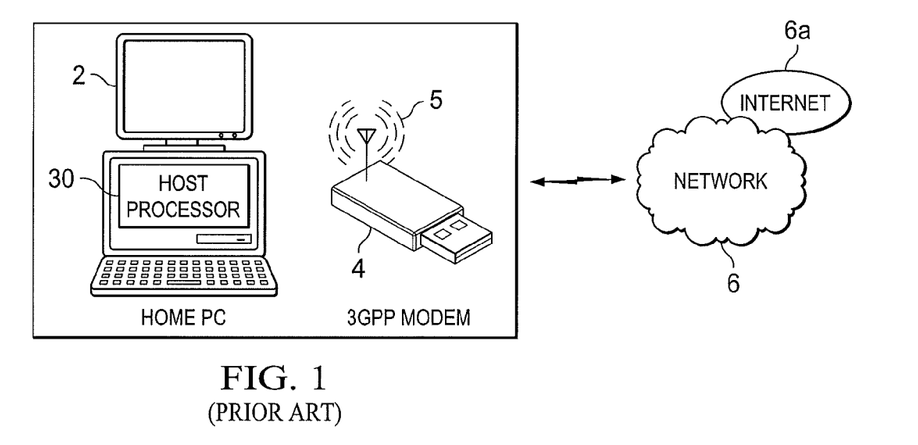
FIG. 1 is a schematic block diagram of a communication system comprising a host terminal and modem.

FIG. 1 is a schematic block diagram of a communication system comprising a host terminal 2 and a modem 4. The host terminal 2 may be a user terminal, and may for example take the form of a desktop computer, laptop computer, tablet style computer, or mobile phone (which may be referred to as a "smartphone"). As shown in FIG. 1, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 1, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2).

The system also comprises a network 6 such as a mobile cellular network 6 (3GPP network or other CDMA network). Elements of the network 6 are well known to those skilled in the art and are not discussed herein.

For connecting to the mobile cellular network 6, the modem 4 comprises a first (network) interface.

With reference to the communication system shown in FIG. 1, the first interface may comprise a wireless transceiver, typically in the form of a radio frequency (RF) transceiver and an antenna 5. The first interface of the modem 4 connects via an antenna (not shown) of the mobile cellular network 6 enabling the modem 4 to establish a channel between itself and the mobile cellular network 6.

This channel referred to above may be referred to as a "context". For example, if the mobile cellular network is a 3GPP network, then the connection between the modem 4 and a 3GPP network 6 may be called a PDP (Packet Data Protocol) context in 2G or 3G terminology, and an EPS (Evolved Packet System) bearer context in LTE (Long Term Evolution standards) terminology. The physical medium of the connection is typically a radio channel such as a 2G, 3G or LTE radio channel and the protocol that drives it may comprise a set of protocol layers as defined for example by 3GPP. The mobile cellular network 6 may be coupled to a further, packet-based network, preferably a wide area network such as the Internet, by way of one or more gateway routers.

For connecting to the host processor 30 on the host terminal 2, the modem 4 comprises a second host interface. The second interface, between the host processor 30 and modem 4, could for example comprise a wired connection such as USB, or a short-range wireless transceiver such as an infrared connection or a radio frequency connection (e.g. Bluetooth).

The host 2 and modem 4 are used to establish communication events, for example, using standardized protocols. The aim of the disclosure is to provide architectural flexibility for establishing communication events, particularly but not exclusively multimedia events.

SUMMARY

According to the present disclosure, in one aspect there is provided a host device having: a modem interface arranged to transmit transmission units between the host device and a modem; a communication function configured to generate primitives to establish a communication event between the host device and a remote device; a client agent connected to receive control primitives from the communication function and operable to convert the control primitives to data transmission units; a host routing interface operable to route data transmission units from the client agent according to a predetermined route option which is set based on whether a communication event control function for processing the data transmission units is located on the host device or the modem.

The present disclosure also provides a modem having: a network interface arranged to connect to a network; a server agent connected to receive transmission units and operable to convert the transmission units into control primitives for a communication event control function at the modem; a routing interface arranged to route to the server agent transmission units received at the modem from a host device.

The disclosure also provides a method of setting up a communication event in the system wherein a host device comprises an application processor for initiating a communication event and a modem communicates with a communication network for establishing the communication event with a remote device, the method comprising: the application processor generating control primitives for establishing the communication event; converting the control primitives to data transmission units; routing the data transmission units to a communication event control function; converting the data transmission units into control primitives for processing by the communication event control function; and the communication event control function acting on the control primitives in establishing a communication event.

BRIEF DESCRIPTION

Reference is now made to the following descriptions taken in conjunction with the accompanying drawings, in which.

DETAILED DESCRIPTION

The following described embodiments apply to a configuration where a host processor and a modem are two separate entities communicating with each other and supporting instant message service functionality. The host processor may be an application processor or terminal equipment such as a PC or Linux machine. In order to establish communication events, a communication event control function is provided in the form of an IP Multimedia Subsystem (IMS). In accordance with embodiments of the disclosure, this function (which can be implemented in a protocol stack) can be embodied at the host or modem. This is referred to herein as a "relocatable stack". It will readily be appreciated that while the following described embodiments describe the concept of a relocatable stack in conjunction with the protocol stack supporting IMS, the techniques and structures referred to herein could be utilised to support other relocatable stacks or more broadly other relocatable communication event control functions.

According to the present disclosure, in one aspect there is provided a host device having: a modem interface arranged to transmit transmission units between the host device and a modem; a communication function configured to generate primitives to establish a communication event between the host device and a remote device; a client agent connected to receive control primitives from the communication function and operable to convert the control primitives to data transmission units; a host routing interface operable to route data transmission units from the client agent according to a predetermined route option which is set based on whether a communication event control function for processing the data transmission units is located on the host device or the modem.

The communication event control function can be implemented as a protocol stack, such as the SIP (Session Initiation Protocol)/SDP (Session Description Protocol) stack. Arrangements in accordance with embodiments of the present disclosure can allow for the stack to be easily located either at the host device or at the modem, with the routing interface taking account the location of the stack.

Where the communication event control function is located it is associated with a server agent which is operable to convert data transmission units to control primitives for controlling the communication event. The server agent is also operable to convert primitives from the communication event control function to data transmission units for routing to the client agent. The client agent is further operable to convert data transmission units to control primitives so that they can be handled by the communication function.

The communication event control function (e.g. stack) and the server agent are located in one embodiment at the host device. In that case, the routing interface is responsible for routing the data transmission units from the client agent within the host device to the communication event control function, and handling responses from the communication event control function all at the host side. Messages resulting from this collaboration can then be transmitted from the host device to modem for transmission to a further terminal with which a communication event is to be established.

In an alternative embodiment, the communication event control function and the server agent are located at the modem. In that case, the host routing interface is responsible for routing data transmission units from the client agent on the host device off the host device to the modem to be handled by the communication event control function and server agent at the modem. Similarly, a routing function at the modem is responsible for returning responses from the communication event control function on the modem to the communication function on the host device. This is done via the server agent at the modem which converts primitives from the communication event control function into data transmission units, and a routing function which routes the data transmission units from the modem to the host.

The present disclosure also provides a modem having: a network interface arranged to connect to a network; a server agent connected to receive transmission units and operable to convert the transmission units into control primitives for a communication event control function at the modem; a routing interface arranged to route to the server agent transmission units received at the modem from a host device.

The modem and host can be directly connected, for example, via a USB interface. Alternatively, the modem interface can comprise a network port for connecting the host device to a network. The routing interface can be responsible for routing data transmission units out of this modem interface via the network to the modem which similarly has a network interface for receiving the data transmission units from the network. This avoids the need for a direct connection between the modem and the host device and therefore significantly improves the flexibility of the architecture where a host device wishes to communicate with a modem and where the stack is located at the modem.

The disclosure also provides a method of setting up a communication event in the system wherein a host device comprises an application processor for initiating a communication event and a modem communicates with a communication network for establishing the communication event with a remote device, the method comprising: the application processor generating control primitives for establishing the communication event; converting the control primitives to data transmission units; routing the data transmission units to a communication event control function; converting the data transmission units into control primitives for processing by the communication event control function; and the communication event control function acting on the control primitives in establishing a communication event.

Figure 2:
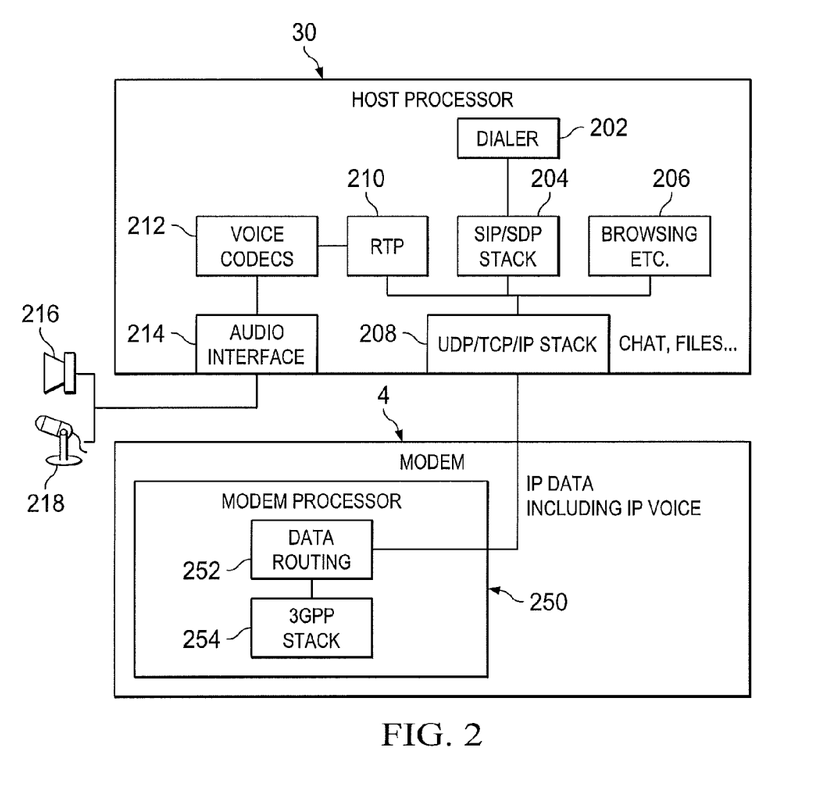
FIG. 2 illustrates a known architecture for a user equipment.

FIG. 2 is described by way of useful background to explain the context of the disclosure.

FIG. 2 illustrates a known architecture for a user equipment (host terminal 2 and modem 4) to conduct a live voice and/or video call with one or more further terminals using a packet-based protocol such as internet protocol (IP). This type of communication is sometimes referred to as "voice over IP" (VoIP) or "video over IP".

The host terminal 2 comprises a host processor 30 and, operatively coupled to the processor 30, is a non-transitory computer-readable storage medium (not shown) such as a magnetic or electronic memory storing one or more application programs. The application programs comprise code arranged to be executed on the host processor 30. The application programs include a phone dialer program 202 comprising code which when executed on the host processor enable the host processor 30 to establish a call to at least one further terminal connected to the network 6. The application programs may also include other programs for example a browser program, email program, instant message program and file transfer program, shown collectively as block 206 in FIG. 2.

The host processor 30 also comprises an audio interface 214 connected to a speaker 216 for outputting audio data and a microphone 218 for receiving audio data. The audio interface 214 may comprise a wired or wireless connection to the speaker 216/microphone 218 as is well known in the art.

Once a call has been established by the phone dialer program 202, input voice data received by microphone 218 is transmitted, via the audio interface 214, to a voice codec 212 arranged to encode the input voice data into encoded audio data according to a suitable speech codec.

The host processor 30 processes the encoded audio data for communication to the network 6 according to Internet protocols.

A SIP/SDP stack 204 allows for SIP signalled communications to and from the network 6. SIP is an open signalling protocol for establishing many kinds of real-time communication sessions. Examples of the types of communication sessions that may be established using SIP include voice, video, and/or instant messaging.

Two protocols that are often used in conjunction with SIP are the Real Time Protocol (RTP) and the Session Description Protocol (SDP). The RTP protocol is used to carry the real-time multimedia data. SDP is used to describe and encode capabilities of session participants. Such a description is then used to negotiate the characteristics of the session so that all the devices can participate (that includes, for example, negotiation of codecs used to encode media so all the participants will be able to decode it, and negotiation of the transport protocol used).

In terms of the known TCP/IP protocol suite, SIP is an application layer protocol. Generally, there are two protocols available at the transport layer these are TCP (Transmission Control Protocol) and UDP (User Datagram Protocol). These protocols are represented by the UDP/TCP/IP stack 208. For call establishment TCP is commonly used, thus the SIP/SDP/TCP/IP protocols are configured to process data received from the phone dialer program 202 for communication to and from the network 6 according to Internet protocols to establish a call to at least one further terminal connected to the network 6.

Once the call is established, the host processor performs encapsulation of the encoded audio data. For example, the encoded audio data may be placed in packets according to the RTP standard represented by block 210. RTP is an application layer protocol in terms of the known TCP/IP protocol suite and data packets created at the application layer are known as messages. The application layer messages are encapsulated at the transport layer. For VOIP communications, UDP is commonly used. When UDP is used at the transport layer a data packet is known as a UDP datagram. The Internet Protocol (IP) at the Internet layer encapsulates the UDP datagram to form an IP datagram (otherwise referred to as an IP packet). Processing of the encoded audio data at the transport and internet layers is represented by block 208. All IP data (including IP voice data) is transmitted over the second interface to the modem 4.

The modem 4 comprises a modem processor 33, the modem processor 33 is arranged to receive the IP data from the host processor 30. The IP data is routed by data routing block 252. The data routing block 252 is responsible for routing of downlink data (received from the network 6) to the host processor 30 on the host terminal 2.

A 3GPP stack 254 is configured to process data for communication to and from a mobile cellular network 6 (3GPP network or other CDMA network), the 3GPP stack 254 comprising a set of protocol layers as defined for example by 3GPP for transferring data across a radio channel such as a 2G, 3G or LTE radio channel via the first interface.

When IP data is received from the network 6 via the first interface the IP data is routed from the modem 4 to the host processor 30. The host processor 30 performs data decapsulation represented by blocks 208 and 210 and the encoded audio data is supplied to voice codec 212. The voice codec 212 is arranged to decode the encoded audio data into decoded audio data, according to a suitable speech codec, for output via the speaker 216.

The SIP/SDP stack for IMS 204 is shown executed in the host processor in FIG. 2. It can be executed either in the host processor or in the modem processor. Running it in the modem has the advantage of providing an integrated solution, for example, supporting voice over IP independently from the host processor. Running it in the host processor has the advantage of simplifying the architecture especially when supporting multiple access technologies (LTE, WiFi, WiMAX, etc.) and having it in an application friendly environment.

Figure 3:
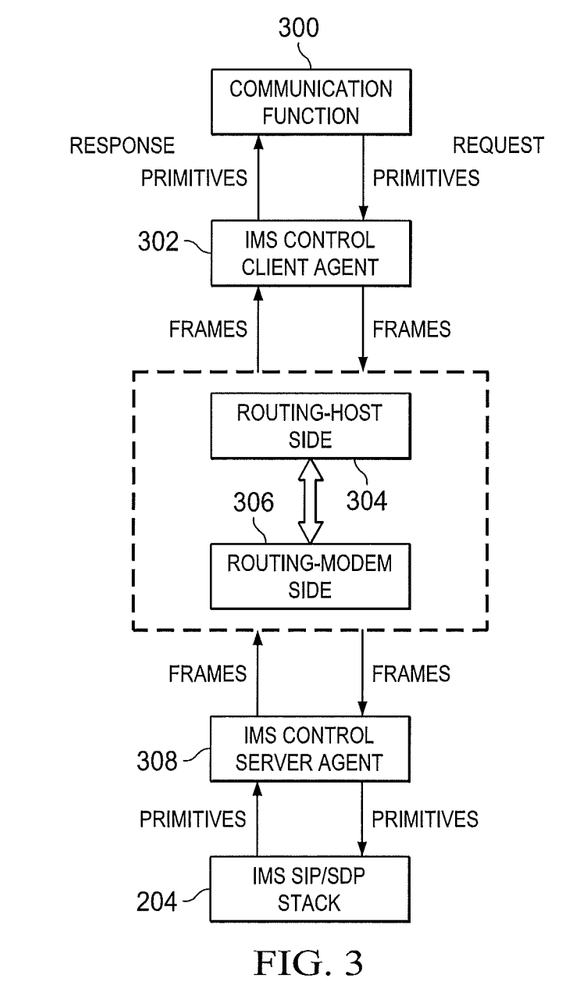
FIG. 3 is a schematic functional diagram illustrating a relocatable stack.

FIG. 3 is a schematic functional diagram illustrating a solution for making the IMS stack easily relocatable in a manner such that it can be controlled via a TCP socket interface. In this way, using ports forwarding or direct IP address routing, the IMS stack could be controlled the same way running on an application processor in the modem or even remotely over a network such as the Internet.

In FIG. 3, reference numeral 300 denotes a communication function of an IP Multimedia Subsystem. One example might be the dialer 202. Another example (shown in FIG. 5) is RCS and video applications 203 with the RCS services framework 205. The purpose of the communication function is to generate data for establishing and running a communication event. On the application side, an IMS control client agent 302 is responsible for translating control primitives from the communication function 300 into data frames, and vice versa for responses received directed towards the communication function. These frames can then be routed on the host or modem side 304, 306 to an IMS control server agent 308 which is located in the device hosting the IMS SIP/STP stack 204. The IMS control server agent 308 is responsible for translating the data frames into control primitives and vice versa for responses received from the stack. The conversion from primitives to frames and from frames to primitives is achieved according to an IMS control protocol.

The IMS control client agent is located on the application processor (host side). The IMS control server agent 308 is located in the device that houses the IMS stack 204. As mentioned above, this could be the host or modem side.

Figure 5:
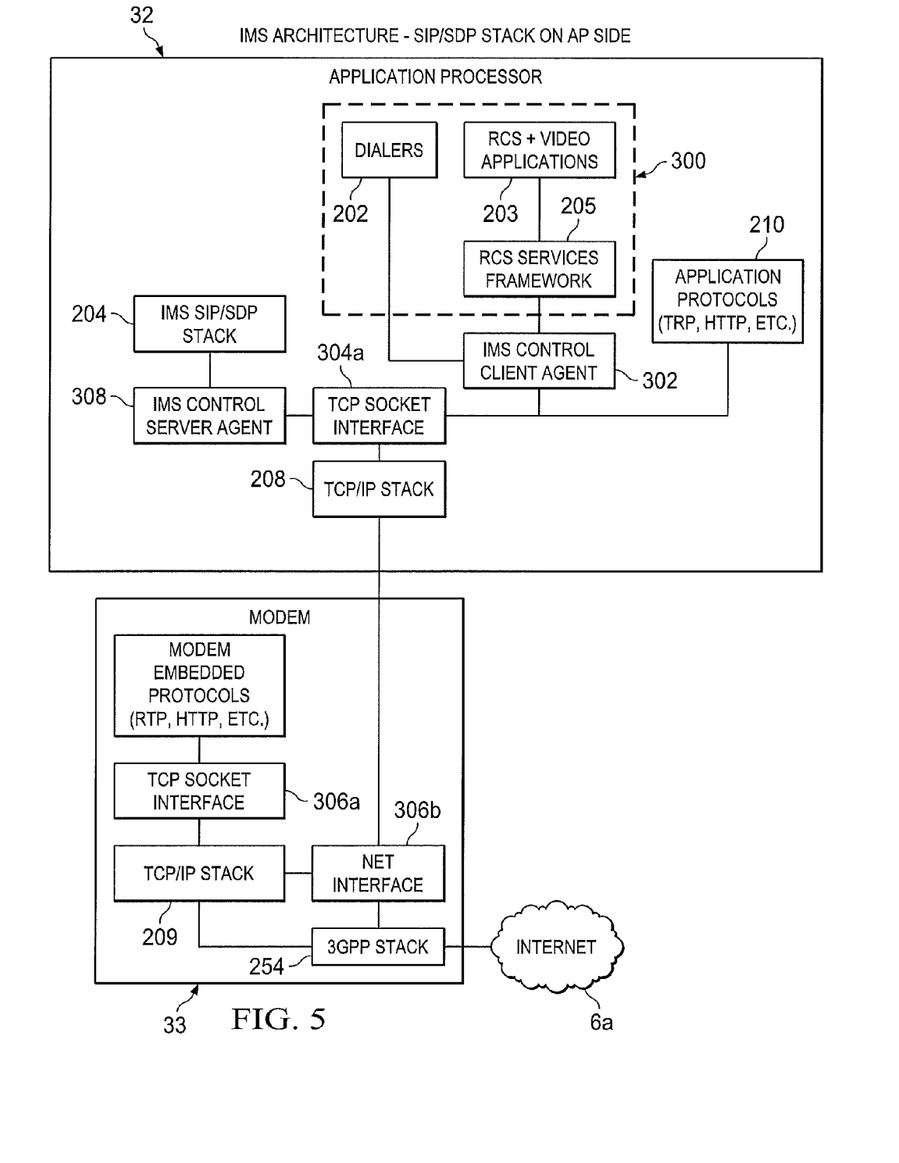
FIG. 5 is a schematic block diagram of a host processor and a modem with a relocatable stack on the host side.

The routing entity 304, 306 on the host and modem side each incorporate a TCP socket interface 304a, 306a (FIG. 5). Controlling the IMS stack can be achieved by exchanging TCP/IP messages made up of the frames produced by the IMS control client agent 302 (on the host side) or the IMS control server agent 308 (on the IMS side). When running on the application processor, the routing can be achieved automatically by the TCP socket interface 304a resolving the TCP port locally. When the IMS stack runs in the modem, the routing can be performed by a net interface layer 306b located on top of the 3GPP stack 254.

In all cases embodiments described herein the routing is performed based on a dedicated local IP address, on a dedicated TCP port or by detecting that the packets transport the IMS control protocol.

Figure 4:
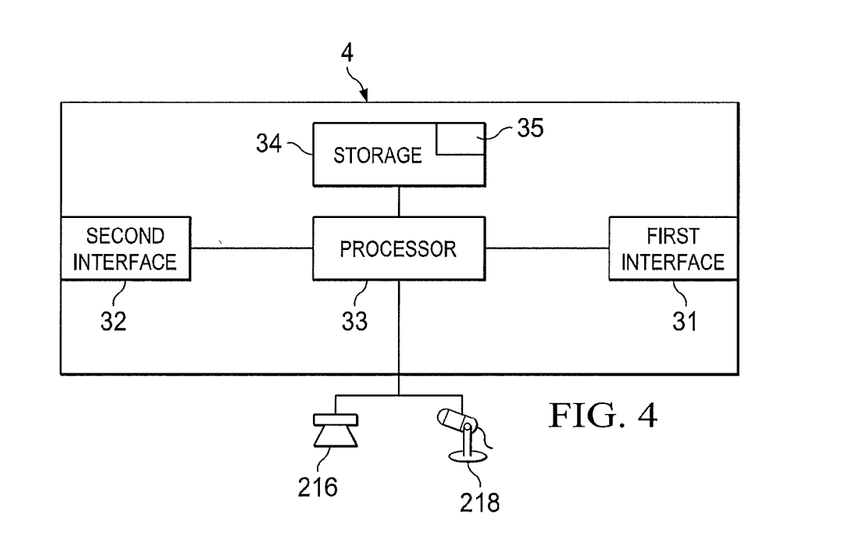
FIG. 4 is a schematic block diagram of a modem.

Referring to FIG. 4, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33, so as when executed to send and receive packets between the host 2 and network 6, and to perform the additional operations of the modem 4 as discussed below. However, the possibility of some or all of the modem functionality being implemented in dedicated hardware is not excluded.

The modem 4 comprises a first interface 31 corresponding to the first interface referred to above with reference to FIG. 1. The modem 4 also comprises a second interface 32 corresponding to the second interface referred to above with reference to FIG. 1. As shown in FIG. 4 the modem 4 has direct access to interface with a speaker 216 for outputting audio data and a microphone 218 for receiving audio data.

FIG. 5 illustrates a host processor 30 and the modem 4 according to an embodiment of the present disclosure with the IMS stack on the host side.

As in the known architecture for a user equipment (host terminal 2 and modem 4) the host processor 30 is operatively coupled to a non-transitory computer-readable storage medium (not shown) such as a magnetic or electronic memory storing one or more application programs. The application programs comprise code arranged to be executed on the host processor 30. The application programs include the phone dialer program 202 (referred to above with reference to FIG. 2) comprising code which when executed on the host processor 30 enables the host processor 30 to establish a call to at least one further terminal connected to the network 6. The application programs may also include other programs for a communication function for example the browser program, email program, instant message program and file transfer program (referred to above with reference to FIG. 2) shown collectively as block 300.

The host processor 30 comprises an IMS SIP/SDP stack 204, and TCP/IP stack 208 configured to process data received from the phone dialer program 202 or IMS program in block 300 for communication to and from the network 6 according to Internet protocols to establish a communication event to at least one further terminal connected to the network 6.

The SIP/SDP/TCP/IP protocols are configured to process data received from the phone dialer program 202 for communication to and from the network 6 according to Internet protocols to establish a call to at least one further terminal connected to the network 6. SIP leverages SDP to establish streaming parameters for the session so that all the devices can participate (that includes, for example, negotiation of codecs used to encode media so all the participants will be able to decode it, and negotiation of the transport protocol used).

Where the SIP/SDP stack is on the host side, once call establishment is complete, streaming parameters from the SIP/SDP negotiation are supplied from the host processor 30 via the second interface 32 to the modem 4.

The parameters provided to the modem 4 resulting from SIP/SDP negotiation include a source IP (IPv4 or IPv6) address (of the host terminal 2) and one or more destination IP (IPv4 or IPv6) addresses (of the further terminal(s) to which the call has been established). Both the source and destination IP address are included in the IP header of the IP packets transmitted to the network 6 following processing at block 408. The destination IP address identifies the further terminal connected to the network 6 to which the packet should be sent. The source IP address identifies the host terminal 2 to the further terminal so that the further terminal can transmit data to the host terminal across the network 6.

According to the embodiments of the present disclosure, in order for the SIP/STP/TCP/IP protocols to process data to establish a communication event such as a call, data (control primitives) is supplied from the communication functions 300 to the IMS control client agent 302. The client agent 302 converts this data (primitives) into frames which can be transmitted as messages with headers according to the TCP protocol. In FIG. 5, the client agent 302 is directly connected to the socket interface 304a, and therefore the frames from the client agent are transmitted directly to this socket interface. At the socket interface, the header is resolved and these frames are detected and routed to the IMS control server agent 308 which translates the frames back to primitives comprehensible to the stack 204. The TCP socket interface 304a can also receive other messages, for example, from application protocols 210. These are also resolved at the TCP socket interface and routed as appropriate to the TCP/IP stack 208.

When the stack 204 generates a response, this is supplied in the form of primitives to the server agent 308 which translates it into frames directed to the TCP socket interface 304a. The socket interface resolves the header of the frames and routes them to the TCP/IP stack 208 for transmission off the host processor 30. The messages received at the modem processor 33 are routed by the net interface 306b to the 3GPP stack 254 and formulated into a wireless protocol for dispatch over the Internet to the further terminal.

Figure 6:
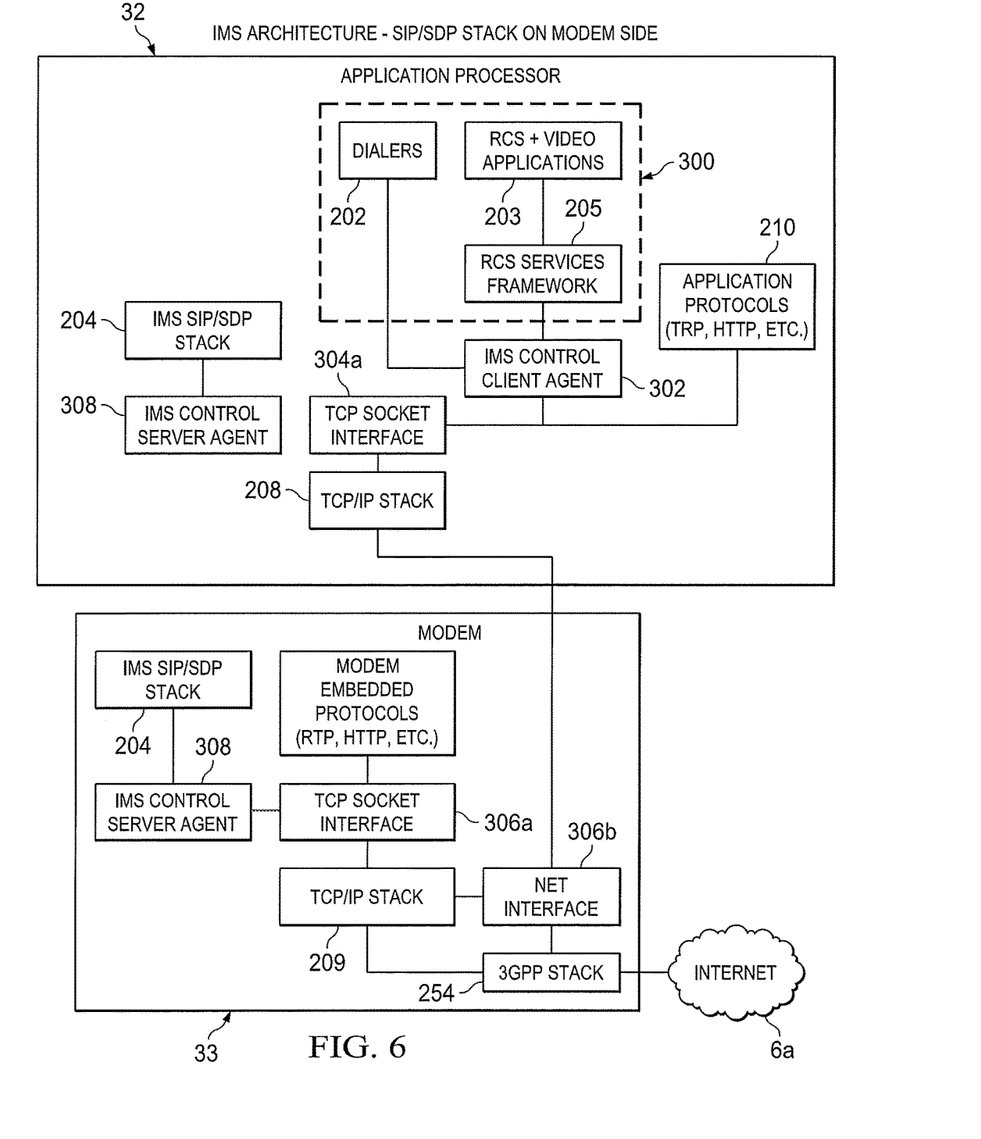
FIG. 6 is a schematic block diagram of a host processor and a modem with the relocatable stack on the modem side.

It is noted at this point that the modem processor 33 incorporates a TCP socket interface 306a which has not in this embodiment performed a function. Nevertheless, it performs part of the infrastructure which allows the IMS stack 204 to be readily relocated as will become evident from a discussion of FIG. 6. In FIG. 6, like numerals denote like parts as in FIG. 5 and perform the same function with the following notable exceptions. The TCP socket interface 304a in the host processor 30 is no longer connected to the server agent 308. It still performs the function to route messages from the application protocols 210 to the TCP/IP stack 208 however. The stack 204 itself has been relocated to the modem processor 33, as has the server agent 308. The server agent is connected to the TCP socket interface 306a on the modem side which can route messages between the stack 204 and the TCP/IP stack 209.

Figure 7:
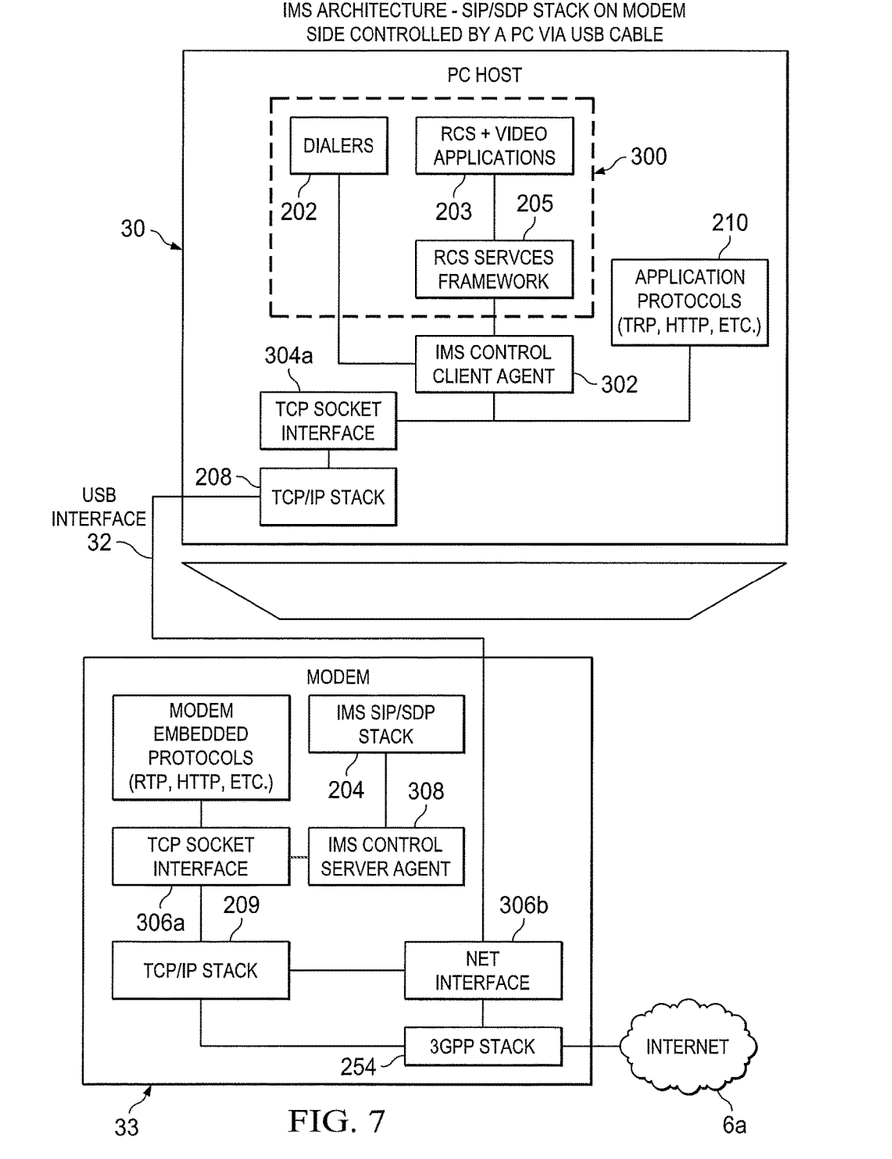
FIG. 7 is a schematic block diagram of a host processor and a modem communicating via a USB interface.

Operation of the embodiment in FIG. 6 will now be described. Primitives from the communication function 300 are converted by the client agent 302 into frames as described above. The frames are resolved at the TCP socket interface and routed to the TCP/IP stack 208 and off the host processor at port 32. When received by the modem processor 33 they are routed by net interface 306b to the TCP/IP stack 209 and the TCP socket interface 306a. This routes them to the server agent 308 where the frames are converted to primitives comprehensible for the stack 204. In reverse, the stack 204 generates primitives which are converted by the server 308 into frames directed to the TCP socket interface 306a which resolves them to the PCT/IP stack 209 and the net interface 306b. The net interface 306b routes them back to the host processor 30 where they are directed to the client agent 302 and converted into primitives for the communication function 300. FIG. 7 illustrates an architecture according to the embodiment of FIG. 6 where the interface between the host processor 30 and the modem processor 33 is via USB. In other respects operation of the embodiment of FIG. 7 is the same as the embodiment of FIG. 6.

Figure 8:
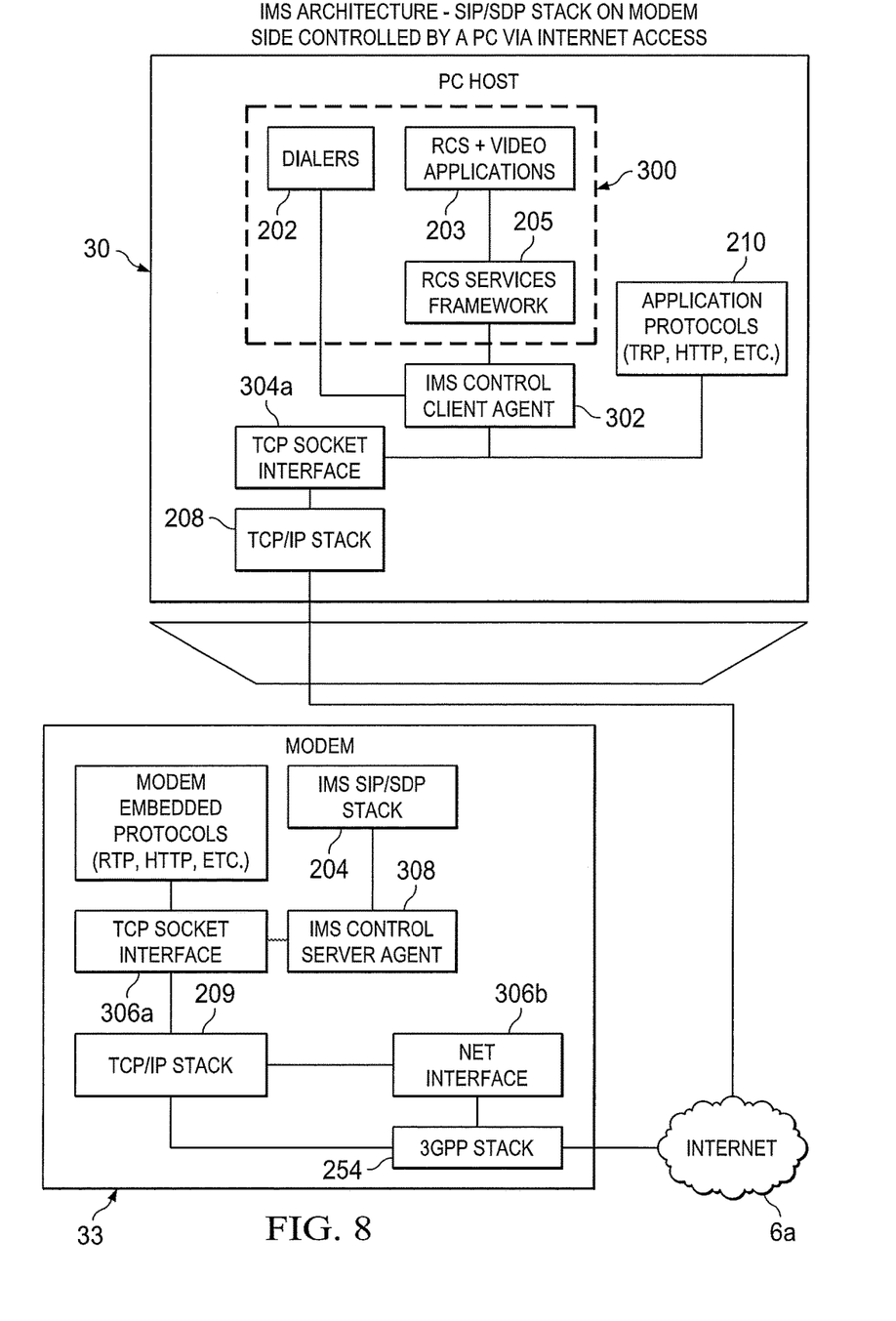
FIG. 8 is a schematic block diagram of a host processor and a modem communicating via a network.

FIG. 8 illustrates an alternate embodiment to the scenario where the IMS stack 204 is implemented at the modem processor 33. According to FIG. 8, TCP/IP messages including frames from the client agent 302 are routed out of port 32 to the Internet 6. Routing can be accomplished according to the IP routing protocol to direct those messages to the modem over the wireless network so that they are received by the 3GPP stack 254. They are received by the modem processor 33 in the form of wireless signals which are demodulated, decoded, etc. via the 3GPP stack into TCP/IP messages. They are routed by the net interface 306b to the TCP/IP stack 209 and then to the socket interface 306a from where they can be directed to the server agent 308. This has a significant advantage that the modem no longer needs to be directly connected or integrated with the host in order for it to be controlled by it. Instead, the IMS stack can be controlled remotely via the Internet through the intervening medium of TCP/IP messages routed over the Internet and containing frames received from the client agent 302.

Those skilled in the art to which this application relates will appreciate that other and further additions, deletions, substitutions and modifications may be made to the described embodiments.

What is claimed is:

1. A host device, comprising:
    a modem interface arranged to transmit transmission units between the host device and a modem;
    a communication event control function configured to generate control primitives to establish a communication event between the host device and a remote device, wherein the communication event control function operates at a protocol layer in a relocatable protocol stack located in either the host device or the modem;
    a client agent connected to receive the control primitives from the communication event control function and operable to convert the control primitives to data transmission units; and
    a host routing interface operable to route data transmission units from the client agent according to a predetermined route option which is set based on whether the relocatable protocol stack of the communication function for processing the data transmission units is located on the host device or the modem.

2. The host device according to claim 1, wherein the host routing interface directs data transmission units received from the communication event control function to the client agent.

3. The host device according to claim 2, wherein the client agent is operable to convert the data transmission units received from the communication event control function to the control primitives for the communication event control function.

4. The host device according to claim 1, wherein the communication event control function is implemented at the host device, and wherein the host device comprises a server agent for converting data transmission units from the client agent to the control primitives for the communication event control function.

5. The host device according to claim 1, wherein the modem interface includes a transport control protocol stack including a transport control protocol layer and wherein the data transmission units conform to the transport control protocol.

6. The host device according to claim 5, wherein the host routing interface comprises a socket interface conforming to the transport control protocol.

7. The host device according to claim 1, wherein the control primitives are generated in the protocol stack.

8. The host device according to claim 7, wherein the protocol stack is an SIP/SDP stack.

9. The host device according to claim 1, wherein the modem interface comprises a network port for connecting the host device to a network, and wherein the data transmission units are routable to a communication event control function located on a modem connected to the network.

10. The host device according to claim 1, wherein the modem interface comprises a direct connection interface to a modem.

11. The host device according to claim 10, wherein the direct connection interface is a USB interface.

12. A modem, comprising:
    a network interface arranged to connect to a network;
    a server agent connected to receive transmission units and operable to convert the transmission units into control primitives for a communication event control function at the modem wherein the communication event control function is implemented in a protocol layer of a relocatable protocol stack located in the modem; and
    a routing interface arranged to route to the server agent transmission units received from a host device at the relocatable protocol stack of the modem.

13. The modem according to claim 12, wherein the network interface is a wireless network interface arranged to transmit and receive wireless messages over the network, said wireless messages including data transmission units routed between the host device and the server agent.

14. The modem according to claim 12, comprising a host interface for connecting the routing interface to the host device for transmission of data transmission units between the host device and the modem.

15. The modem according to claim 12, wherein the control primitives are generated in the relocatable protocol stack.

16. The modem according to claim 15, wherein the relocatable protocol stack is an SIP/SDP stack.

17. A method of setting up a communication event in a system wherein a host device comprises an application processor for initiating a communication event and a modem communicates with a communication network for establishing the communication event with a remote device, the method comprising:
    the application processor generating first control primitives for establishing the communication event;
    converting the first control primitives to first data transmission units;
    routing the data transmission units to a communication event control function wherein the communication event control function is implemented in a protocol layer of a relocatable protocol stack located in either the host device or the modem, but not both;
    converting the data transmission units into corresponding control primitives for processing by the communication event control function; and
    the communication event control function acting on the corresponding control primitives in establishing the communication event.

18. The method according to claim 17, wherein the communication event control function generates a response in the form of second control primitives, the method comprising converting the second control primitives into second data transmission units, routing the second data transmission units to the communication event control function, and converting the second data transmission units into control primitives for the application processor to process in establishing the communication event.

19. The method according to claim 17, which comprises routing the data transmission units from the application processor to the modem via the communication network whereby the application processor can communicate with the communication event control function located on the modem which is connected to the network.

20. The method according to claim 17, wherein the data transmission units are routed from the application processor to the modem via a direct connection between the application processor and the modem.

* * * * *

UNITED STATES PATENT AND TRADEMARK OFFICE
CERTIFICATE OF CORRECTION

PATENT NO. : 10,091,251 B2
APPLICATION NO. : 13/856520
DATED : October 2, 2018
INVENTOR(S) : Thomas Fleury and Flavien Delorme Page 1 of 1

It is certified that error appears in the above-identified patent and that said Letters Patent is hereby corrected as shown below:

In the Claims

In Column 10, Line 48, Claim 17, after --modem-- delete ", but not both"

Signed and Sealed this
Fourth Day of December, 2018

Andrei Iancu
*Director of the United States Patent and Trademark Office*